United States Patent [19]
Shang et al.

[11] Patent Number: 5,952,423
[45] Date of Patent: Sep. 14, 1999

[54] PLASTIC COMPOSITIONS FOR MEDICAL CONTAINERS AND METHODS FOR PROVIDING SUCH CONTAINERS AND FOR STORING RED BLOOD CELLS

[75] Inventors: Shaye-Wen Shang; Michael Tung-Kiung Ling, both of Vernon Hills; Lecon Woo, Libertyville, all of Ill.

[73] Assignee: Baxter International Inc., Deerfield, Ill.

[21] Appl. No.: 08/897,042

[22] Filed: Jul. 18, 1997

[51] Int. Cl.⁶ .................................................. A61J 1/10
[52] U.S. Cl. ............................. 525/64; 525/69; 525/71; 525/73; 525/86; 525/178; 525/179; 525/184; 525/191; 525/197; 525/198; 525/240; 525/241; 525/243; 428/35.7; 428/36.8; 428/36.91
[58] Field of Search ........................ 525/64, 69, 71, 525/73, 86, 178, 179, 184, 191, 197, 198, 240, 241, 243; 428/34.1, 35.7, 36.8, 36.91

[56] References Cited

U.S. PATENT DOCUMENTS

| | | |
|---|---|---|
| 4,140,162 | 2/1979 | Gajewski et al. ..................... 150/1 |
| 4,710,532 | 12/1987 | Hull et al. . |
| 4,711,922 | 12/1987 | Hull et al. . |
| 4,789,700 | 12/1988 | Hull et al. . |
| 4,824,893 | 4/1989 | Hull . |
| 4,870,204 | 9/1989 | Hull et al. . |
| 4,883,905 | 11/1989 | Hull et al. . |
| 4,892,967 | 1/1990 | Hull et al. . |
| 4,931,583 | 6/1990 | Hull et al. . |
| 4,954,649 | 9/1990 | Hull et al. . |
| 5,026,347 | 6/1991 | Patel . |
| 5,037,419 | 8/1991 | Valentine et al. . |
| 5,100,401 | 3/1992 | Patel . |
| 5,167,657 | 12/1992 | Patel . |
| 5,302,454 | 4/1994 | Cecchin et al. . |
| 5,482,772 | 1/1996 | Strack et al. . |
| 5,500,397 | 3/1996 | Cuffiani et al. . |
| 5,539,057 | 7/1996 | Giroux . |
| 5,585,317 | 12/1996 | Sacchetti et al. . |
| 5,585,434 | 12/1996 | DeNicola, Jr. et al. . |
| 5,589,549 | 12/1996 | Govoni et al. . |
| 5,683,768 | 11/1997 | Shang et al. ......................... 525/66 |

FOREIGN PATENT DOCUMENTS

| | | |
|---|---|---|
| 0498701A1 | 8/1992 | European Pat. Off. . |
| 419373B1 | 11/1994 | European Pat. Off. . |

OTHER PUBLICATIONS

International Search Report for PCT/US98/12949, dated Oct. 19, 1998.

Sai S. Young, et al., "A 'Phosphite–Free' System To Stabilize Polyolefins", *Polyolefins IX International Conference*, Feb. 26–Mar. 1, 1995, Houston, Texas.

S.F. Laermer and P.F. Zambetti, "Alpha–Tocopherol (Vitamin E)—The Natural Antioxidant For Polyolefins", *Journal of Plastic Film & Sheeting*, vol. 8, Jul. 1992.

*Primary Examiner*—Nathan M. Nutter
*Attorney, Agent, or Firm*—Andrew G. Kolomayets; Denise M. Serewicz; Bradford R. L. Price

[57] ABSTRACT

Plastic compositions, containers useful in the storage of red blood cells, and methods for providing such red blood cell storage containers and for storing red blood cells are disclosed. The plastic composition includes a polyolefin copolymer and a plasticizer. The flexibility of such plastic compositions and containers made thereof is substantially unchanged upon heating to a high temperature relative to its flexibility before such heating.

41 Claims, 4 Drawing Sheets

PLASTIC COMPOSITIONS FOR MEDICAL CONTAINERS AND METHODS FOR PROVIDING SUCH CONTAINERS AND FOR STORING RED BLOOD CELLS

The present invention relates, in general, to plastic compositions and, in particular, to plastic compositions that may be used for medical containers, such as containers for the storage of blood and/or blood cells. More particularly, the present invention relates to plastic compositions, to plastic containers made from such compositions and to methods for containing or storing whole blood or blood cells, such as red blood cells, which suppresses the hemolysis of blood cells.

BACKGROUND

Whole blood is typically described as being made up of various cellular components such as red blood cells (RBCs), white blood cells (WBCs) and platelets, suspended in a liquid component, plasma. Each component plays a specific and important role in the human body. For example, platelets (together with clotting factors and other substances in the blood) are responsible for stopping bleeding. WBCs are primarily responsible for fighting disease. RBCs transport oxygen ($O_2$) and carbon dioxide ($CO_2$) to and from body tissues. The $O_2$ and $CO_2$ are carried by a protein called hemoglobin, which is found inside the RBC.

Whole blood can be (and is routinely) separated by centrifugation, membrane filtration or other techniques into its constituent components, and the separated component may be administered to a patient in need of that particular component. For example, RBCS may be administered to patients who have experienced rapid blood loss or to improve the oxygen carrying capability of blood in patients suffering from anemia and the like.

Most commonly, RBCs are separated from whole blood by introducing anticoagulated whole blood into a rotating centrifuge chamber. More specifically, whole blood is withdrawn from a donor through a needle that is inserted into the vein of the donor. The needle communicates with plastic tubing through which the blood flows to a (usually preattached) plastic container. The blood inside the plastic container is then subjected to a centrifugal force by rotating the centrifuge. Rotation of the centrifuge causes the components of whole blood to sediment into layers or bands based on the different densities of the components. The more dense (or "heavier") components, such as RBCs, are thus "separated" from the lighter components, such as platelets and plasma. The separated layer or band of RBCs may then be transferred to a separate (usually plastic) container where they are stored until transfusion to a patient. Alternatively, the plasma and platelets may be expressed from the collection container, leaving the RBCs in the collection container for storage.

For a variety of reasons, the storage period can last several days and sometimes even several weeks. Unfortunately, extended storage of RBCs may negatively affect the function and viability of RBCS. For example, one concern during the storage of RBCs is that the membrane surrounding the RBC cell will rupture. The rupturing of the RBC membrane is commonly referred to as "hemolysis". The hemolysis of RBCs results in the release of hemoglobin, thus, impairing the RBC's ability to transport $O_2$ and $CO_2$. These RBCs are less suitable for transfusion to a patient.

The plastic containers used for the storage of blood and/or blood cells must be made of materials that are, of course, suitable for the storage of blood and, preferably, enhance the viability of the stored blood cells. Some plastics, that may be otherwise suitable for storing blood and/or blood cells, may be too rigid for use in medical containers. Accordingly, these materials require a plasticizer to soften the material and provide the container with flexibility. One such material that has been commonly used for medical containers is polyvinyl chloride (PVC). Because PVC alone is too rigid to be used for flexible blood containers, it is typically combined with a plasticizer.

Several different plasticizers are suitable for use with PVC. For example, plasticizers from the family of phthalate esters, and in particular, di-2-ethylhexylphthalate (DEHP) have been used in combination with PVC resins. In addition to DEHP, plasticizers such as triethylhexyltrimellitate (TEHTM) have also been used with PVC resins. More recently, it has been discovered that citrate esters are capable of plasticizing PVC. PVC plasticized with citrate ester is described, for example, in U.S. Pat. Nos. 4,710,532, 4,789,700, 4,870,204, 4,883,905, 4,892,967, 4,931,583, 4,824,893, 4,711,922 and 4,954,649, all of which are incorporated by reference herein.

It has been observed that some plasticizers appear to have a beneficial effect on the viability of stored blood and/or red blood cells. More specifically, it has been observed that red blood cells stored in plastic containers that include certain plasticizers experience a lower rate of hemolysis than in containers free of plasticizers. It is believed that the interaction of the stored blood cells and the plasticizer (in the container wall) helps maintain the integrity of the RBC membrane, thus resulting in reduced hemolysis. Thus, even for those materials that are not as rigid as PVC and are otherwise suitable for use in the storage of blood, it may be beneficial that the plastic container include a sufficient amount of plasticizer to reduce the rate of hemolysis in the stored blood.

Examples of such blood storage containers are described in U.S. Pat. Nos. 5,026,347, 5,100,401 and 5,167,657, all of which are assigned to the assignee of the present of application and are incorporated by reference herein. The blood storage containers described therein are made from a plastic composition that includes polyolefin and citrate ester plastisizers. The polyolefin described in these patents, is a polyolefin copolymer that includes a central block of ethylene and butylene units with terminal blocks of styrene. The polyolefin is combined with a citrate ester plasticizer to form a plastic composition that is suitable for use in a blood storage container and wherein the amount of citrate ester is sufficient to suppress the level of hemolysis in stored red blood cells. The plastic material described therein may further include an amount of propylene.

Although the above described containers are believed to have worked satisfactorily, it has been observed that some polyolefins, when combined with plasticizers, appear to lose some of their flexibility and become more brittle after being subjected to high temperature heating (such as occurs during steam sterilization). It is believed that at least part of the reason for the material becoming more brittle after sterilization may be that high temperature heating results in a molecular rearrangement of the material, which increases the crystallinity (and, therefore, rigidity) of the material. However, in addition, it is believed that the decrease in flexibility results from the inability of the plastic material to retain the plasticizer within the body of the plastic material. Stated differently, it is believed that during heating, the plasticizer migrates out from the plastic material to the outer surface of the material. The migration of the plasticizer, therefore, results in there being less plasticizer available for contact with the stored blood cells. Ultimately, this may lead to reduced hemolysis suppression in the stored red blood cells. For these reasons, it is desirable to provide a plastic composition that can be used as a medical container, such as a container for storing blood and/or red blood cells, which remains flexible after being exposed to heat and/or retains most of the plasticizer during heating, such as in a steam sterilization process.

SUMMARY OF THE CLAIMED INVENTIONS

There are several different aspects to the present invention which may be employed together or separately without departing from the present invention.

For example, in one aspect, the present invention is directed to a flexible plastic composition that includes a polyolefin copolymer and a plasticizer. The flexibility of the plastic composition remains substantially unchanged upon heating to a sterilizing temperature relative to its flexibility before heating.

In another aspect, the present invention is also directed to flexible plastic containers defined by a container wall where at least a portion of the container wall interior is made of a plastic composition that includes a polyolefin copolymer and a plasticizer. The flexibility of the plastic container remains substantially unchanged upon heating to a sterilizing temperature relative to its flexibility before such heating.

In another aspect, the present invention is also directed to methods for providing a blood storage container. The method includes providing a first polyolefin copolymer and combining the polyolefin copolymer with a plasticizer to form a plastic composition. The plastic composition is extruded, formed into sheets which are then formed into a container. The container is then sterilized. The flexibility of the container remains substantially unchanged after heating to a sterilizing temperature relative to its flexibility before such heating.

The present invention is also directed to a method for storing red blood cells. The method includes providing a flexible plastic container having at least a portion of its interior surface made of a plastic composition that includes a polyolefin copolymer and a material capable of suppressing the hemolysis of red blood cells, such as a plasticizer. The flexibility of the plastic container remains substantially unchanged after heating to a sterilizing temperature relative to its flexibility before such heating. The method includes introducing a quantity of blood cells into the container and maintaining the quantity of blood cells within the container.

DETAILED DESCRIPTION OF THE DISCLOSED EMBODIMENTS

The following detailed description is not intended to set forth all possible variations or applications of the present invention. For this reason, the scope of the invention is not defined by or limited to the embodiments described below, but by the appended claims. Accordingly, the present invention includes future variations or embodiments not presently appreciated by the inventor, but that would be apparent to persons of ordinary skill upon reading this description.

Figure 1:
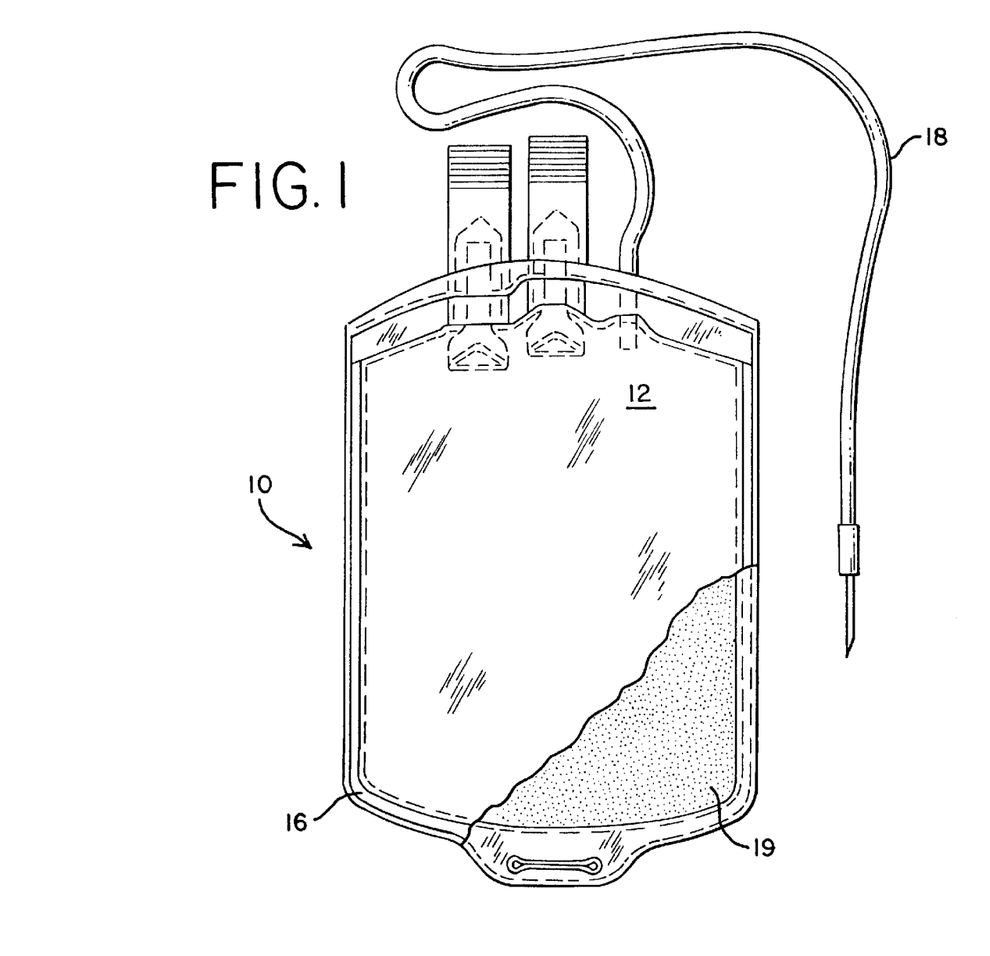
FIG. 1 is a plan view of a medical container, with a portion broken away, depicting one embodiment of the present invention.

Turning now to the figures, FIG. 1 shows a plastic container 10 made in accordance with the present invention. Container 10 includes facing flat walls 12 and 14 made of flexible, plastic sheets sealed together at their periphery 16 in a manner known to those skilled in the art, such as heat sealing, radio frequency heat sealing and sonic welding. Other techniques for providing a container, which does not require sealing of sheets, such as blow molding may also be used. Of course, the present invention is not limited to how the container is formed. Container 10 may also include at least one blood collection tube 18.

Figure 2:
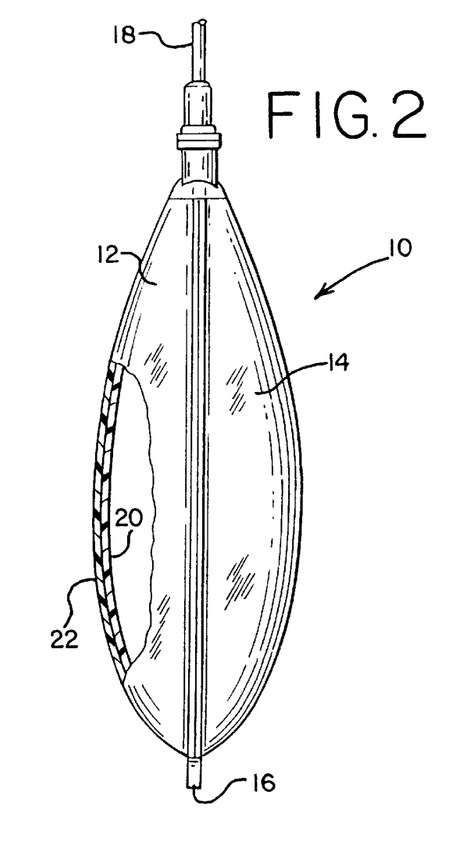
FIG. 2 is a side view of a medical container with a portion broken away, depicting an alternative embodiment of the present invention.

In one embodiment of the present invention, walls 12 and 14 may be made entirely of the plastic composition of the present invention. Alternatively, only the interior surface 19 (the side of the wall that would be in contact with the blood during storage) or even a portion of the interior surface 19 of walls 12 and 14 may be made of the plastic composition of the present invention. Referring to FIGS. 1 and 2, container walls 12 and 14 may be made of a single layer of the plastic composition or, alternatively, as shown in FIG. 2, container walls 12 and 14 may be made of two or more layers 20 and 22 laminated or coextruded together wherein at least the inner layer 20 or a portion of inner layer 20 is made of the plastic composition of the present invention.

The plastic composition may be any flexible polyolefin or copolymer thereof that is suitable for use in the extended storage of red blood cells and, preferably, is steam sterilizable. Certain polyolefins combined with plasticizer are suitable for use in the storage of red blood cells with suppressed hemolysis. However, as discussed above, it has been observed that some of the polyolefin-based compositions appear to lose some of their flexibility upon high temperature heating (such as occurs during steam sterilization). It is believed that one reason for the decreased flexibility may be the migration of plasticizer from the composition because of the polyolefin's inability to retain the plasticizer.

Thus, in one aspect of the present invention, the plastic composition includes at least one non-PVC plastic, such as polyolefin or a copolymer thereof, where the flexibility of the plastic composition remains substantially unchanged after heating to a sterilizing temperature relative to the flexibility of the composition before heating. More specifically, the polyolefins and polyolefin copolymers of such composition should be suitable for mixing and compounding with plasticizer, and capable of adsorbing plasticizer and retaining the plasticizer during steam sterilization or other high temperature heating.

Although many different polyolefins and copolymers thereof are compatible with plasticizers and are able to adsorb the plasticizer, certain polyolefins prepared by certain polymerization processes (and utilizing certain catalysts for such polymerization) may be better suited for use in plastic compositions of the present invention. For example, polyolefins prepared by the so called "Catalloy" process provide polyolefin copolymers that are capable of adsorbing and retaining most of the original plasticizer even after steam sterilization. The "Catalloy" process is described generally in U.S. Pat. No. 5,302,454 which is incorporated by reference herein. As set forth in U.S. Pat. No. 5,302,454, the Catalloy polymerization process includes at least two stages.

In the first stage, polypropylene is polymerized to form a polypropylene backbone (which can be a homopolymer of polypropylene) and, in the following stages ethylenepropylene and possibly other polymers such as butadiene, butene, and octene are polymerized and added to the polypropylene. The Catalloy process results in spherical particles having a certain porosity and density which, it is believed, makes them effective in adsorbing plasticizers and retaining the plasticizer during steam sterilization at about 120° C. Specifically, it is believed that the plasticizer, when combined with the spherical particles of the polyolefin copolymer, quickly and easily migrates into the pores of the particles. The plasticizer remains embedded within the pores of the polyolefin spheres and is less susceptible to migration to the surface of the container wall during, for example, exposure to heat. Nonetheless, it is understood and believed that the plasticizer is still capable of reducing or suppressing the hemolysis of RBC with the container.

Examples of such polyolefin copolymers are the thermoplastic olefins (which are polyolefin copolymers of polypropylene, ethylene and butene) KS-050, KS-052P, KS-059P, KS-051P, all available from Montell Technology Company BV, Hoofddorp, The Netherlands. In addition to the polyolefins obtained by the Catalloy process, the "Spheripol" and "Spherilene" processes also provide polyolefin copolymers having characteristics similar to the "Catalloy" polyolefin copolymers. Examples of such polyolefin copolymers are copolymers of polypropylene such as SA-849S, also available from Montell Technology Company BV.

Of course the polyolefin copolymer is not limited to polyolefin copolymers prepared by the above-described processes and any other polyolefin or polyolefin copolymer capable of adsorbing and retaining plasticizer after sterilization may be used. Alternatively, two or more of the above polyolefins and/or copolymers thereof may be combined. For example, in one embodiment, both KS-051P and SA-849S polyolefin copolymers may be used in the plastic composition. It should be understood that the above described Catalloy and Spheripol polymers are available in a non-porous pellet and porous spherical forms. In the plastic composition of the present invention, it is preferred that at least one of the copolymers is of the porous spherical variety so as to better adsorb the plasticizer.

The polyolefin or polyolefin copolymers described above may be combined with a selected amount of a suitable plasticizer and/or other material that is capable of suppressing the hemolysis of red blood cells. A plasticizer compatible with the polyolefin copolymer (that is, capable of being mixed and compounded with the polyolefin copolymer and being retained by the polyolefin copolymer during heating) is preferred. Plasticizers capable of being combined with the polyolefin copolymers described above include, but are not limited to, DEHP, TEHTM and, preferably, citrate esters. Of course, other known materials capable of suppressing hemolysis may also be used. Preferably citrate esters of the formula where: $R_1, R_2$ and $R_3 = CH_3$ to $C_{18}H_{37}$ and $R_4 = CH_3$ to $C_7H_{15}$ may be combined with the polyolefin copolymers described above. For example, citrate esters such as acetyltri-n-hexyl citrate, n-butyryltri-n-hexyl citrate, acetyltri-n-(hexyl/octyl/decyl/citrate or acetyltri-n-(octyl/decyl) citrate are suitable and n-butyryltri-n-hexyl citrate (sometimes abbreviated as BTHC) is preferred. Such citrate esters are described in U.S. Pat. Nos. 4,710,532, 4,789,700, 4,870,204, 4,883,905, 4,892,967, 4,931,583, 4,711,922 and 4,954,649 and are available from the Morflex Chemical Co. of Greensboro, N.C.

In addition to the polyolefins and plasticizers described above, other compounds may be included in the plastic composition of the present invention. For example, it may be desired to include a polyolefin copolymer having a lower modulus so as to impart still greater flexibility to the plastic composition, enhance the impact strength of the plastic composition and/or improve the bonding between the various compounds of the plastic composition. Thus the plastic composition may include polyolefin copolymers such as block copolymers. As set forth in U.S. patent application Ser. No. 08/360,913 filed on Dec. 21, 1994 in the name of Shang et al. and assigned to the assignee of the present application, which is incorporated by reference herein, the block copolymers may either be "functionalized" (i.e. containing a functional group of, for example, maleic anhydride) of "non-functionalized". For example, block copolymers of ethylene and butylene with terminal blocks of styrene may be included. Such polyolefin copolymers are available under the name Kraton from the Shell Chemical Co. Particularly well suited for inclusion in the plastic composition are Kraton G-1924X and Kraton K-1660. Other suitable block copolymers are Septon 2007, 4033, 8007, 8006, 1001, 2002, 2043, 2063, 2006, 2104 and 4005 available from Kuraray Corporation of Tokyo, Japan.

In addition, the plastic composition may also include a selected amount of a polyamide (such as, for example, nylon). It is believed that inclusion of polyamide such as nylon makes the container more suitable for sealing by radio frequency (RF) energy. Polyamides are available from many different manufacturers and one particular polyamide that may be used with the plastic composition of the present invention is TPX-159 available from the Henkel Corporation.

The plastic composition may include other compounds useful in manufacture of the plastic composition (and containers made thereof) and useful for the long term storage of blood cells. For example, as reported in U.S. Pat. No. 5,037,415, (incorporated by reference herein), Vitamin E has been identified as also being capable of suppressing the hemolysis of blood cells. Also, as reported in Laermer et al. "Use of Biological Antioxidants as Propylene stabilizers", *Plastics and Rubber Processing and Applicants* 14 (1990) 235–239 and Laermer et al. "Alpha-Tocopherol (Vitamin E) —The natural Antioxidant for Polyolefins "*Journal of Plastic Film and Sheeting,* Vol. 8, July, 1992 (both of which are also incorporated by reference), Vitamin E (which is a mixture of tocopherols and tocotrienols) is an antioxidant that can serve as a stabilizer during extrusion of polyolefins. Vitamin E as an antioxidant is preferred because, as reported in the 1992 article by Laermer, it is non-toxic and is "generally regarded as safe" (GRAS) by the FDA. Of course, other antioxidants (which are also plasticizers) such as epoxidized oil may also be used.

Thus, it is contemplated that one or more of the compounds such as Vitamin E, citrate ester, TEHTM and/or epoxidized oil may be combined with the polyolefin copolymers described above. For example, in one embodiment Vitamin E and BTHC is combined with the polyolefin copolymer. In another embodiment, the amount of BTHC can be reduced and a second plasticizer, such as TEHTM, is combined with Vitamin E and the polyolefin copolymer. Of course, other combinations of the plasticizers, stabilizers and polyolefin copolymers are also possible and within the scope of the present invention. Use of Vitamin E, citrate ester, TEHTM and/or epoxidized oil with plastic compositions is disclosed in more detail in co-pending patent application entitled "Plastic Compositions Including Vitamin E for Medical Containers and Methods For Providing Such Compositions and Containers", filed simultaneously herewith, in the name of Shaye-wen Shang, which is incorporated by reference herein. Vitamin E is available from several suppliers including Hoffman-La Roche Corporation of Nutley, N.J.

Some or all of the above described compounds may be included in the plastic composition of the present invention. For example, anywhere between approximately 30–99%, by weight, of polyolefin copolymer produced, for example, by the Catalloy, Spheripol, Spherilene or other processes may be combined with 0–50%, by weight of another polyolefin copolymer produced by either the Catalloy, Spheripol, Spherilene or other processes. The polyolefin copolymer(s) are further combined with between 1–50%, by weight, of plasticizer such as a citrate ester. In addition, between 0–15%, by weight, of polyamide, and 0–70%, by weight of one or more block copolymers, such as Kraton, may also be included. Finally, the plastic composition may include between 0–30%, by weight, of Vitamin E (and, if desired, 0–10%, by weight of TEHTM and/or 0–15%, by weight of other antioxidants such as epoxodized oil.)

In one embodiment, the plastic composition includes between approximately 40–90%, by weight, of Catalloy polyolefin copolymer, approximately 5–30%, by weight, of a Spheripol polyolefin copolymer, approximately 5–10%, by weight, polyamide, approximately 5–10%, by weight of a first block copolymer such as G-1924X, between approximately 10–30%, by weight, of a second block copolymer, such as Kraton-1660, between approximately 5–30%, by weight, of a citrate ester, such as n-butyryltri-n-hexyl citrate and between approximately 0–5%, by weight of Vitamin E. Additional formulations A–E embodying the present invention are set forth in Table 1. The amounts of the different polymers and compounds are expressed as percentages (by weight) of the plastic composition.

known to those skilled in the art, to form small pellets. The pellets may be further blended and/or formed into plastic sheets ranging in thickness between 5 and 20 mils and, preferably, 5 to 15 mils. The plastic sheets are then brought together in face to face relationship, shaped into containers, inserted with tubing ports (which may be made of the plastic composition or any other steam sterilizable plastic composition) in ways that are known to those of skill in the art. The sheets of formed plastic material are then sealed by, for example, RF sealing and sterilized by steam or other form of sterilization.

Figure 3:
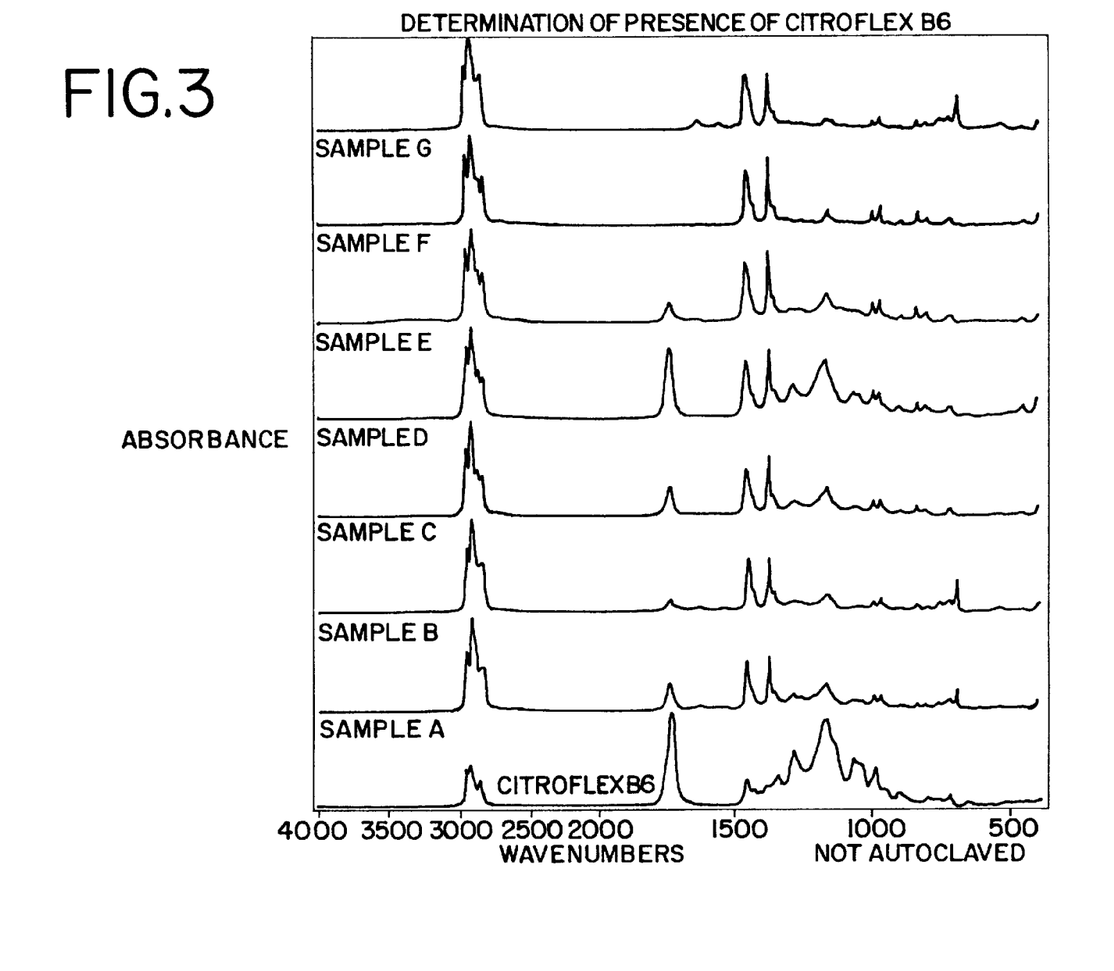
FIG. 3 is the Fourier Transform Infrared (FTIR) absorbance spectra for certain medical containers embodying the present invention prior to steam sterilization.
Figure 4:
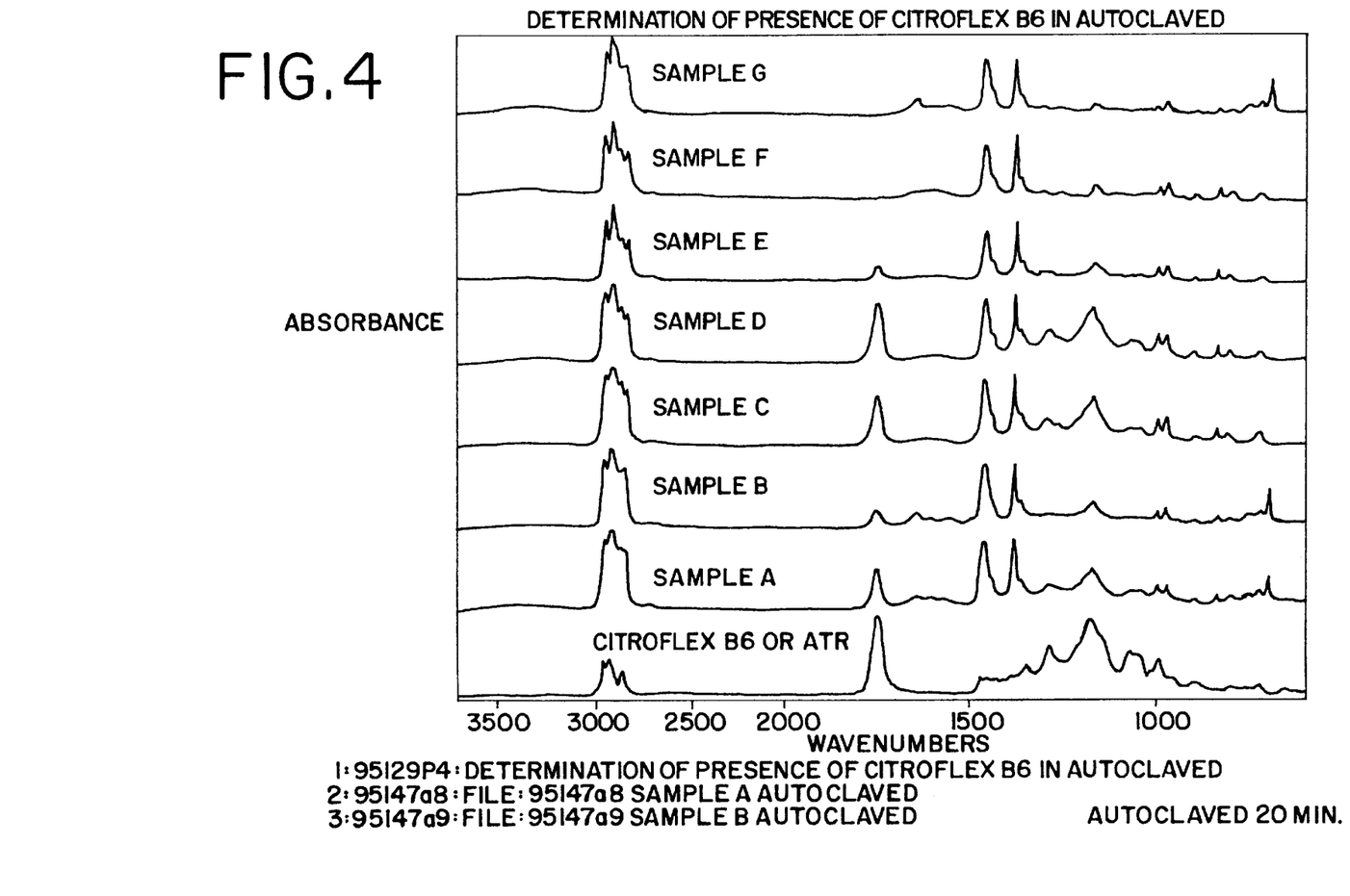
FIG. 4 is the FTIR absorbance spectra for certain medical containers embodying the present invention after 20 minutes of steam sterilization.
Figure 5:
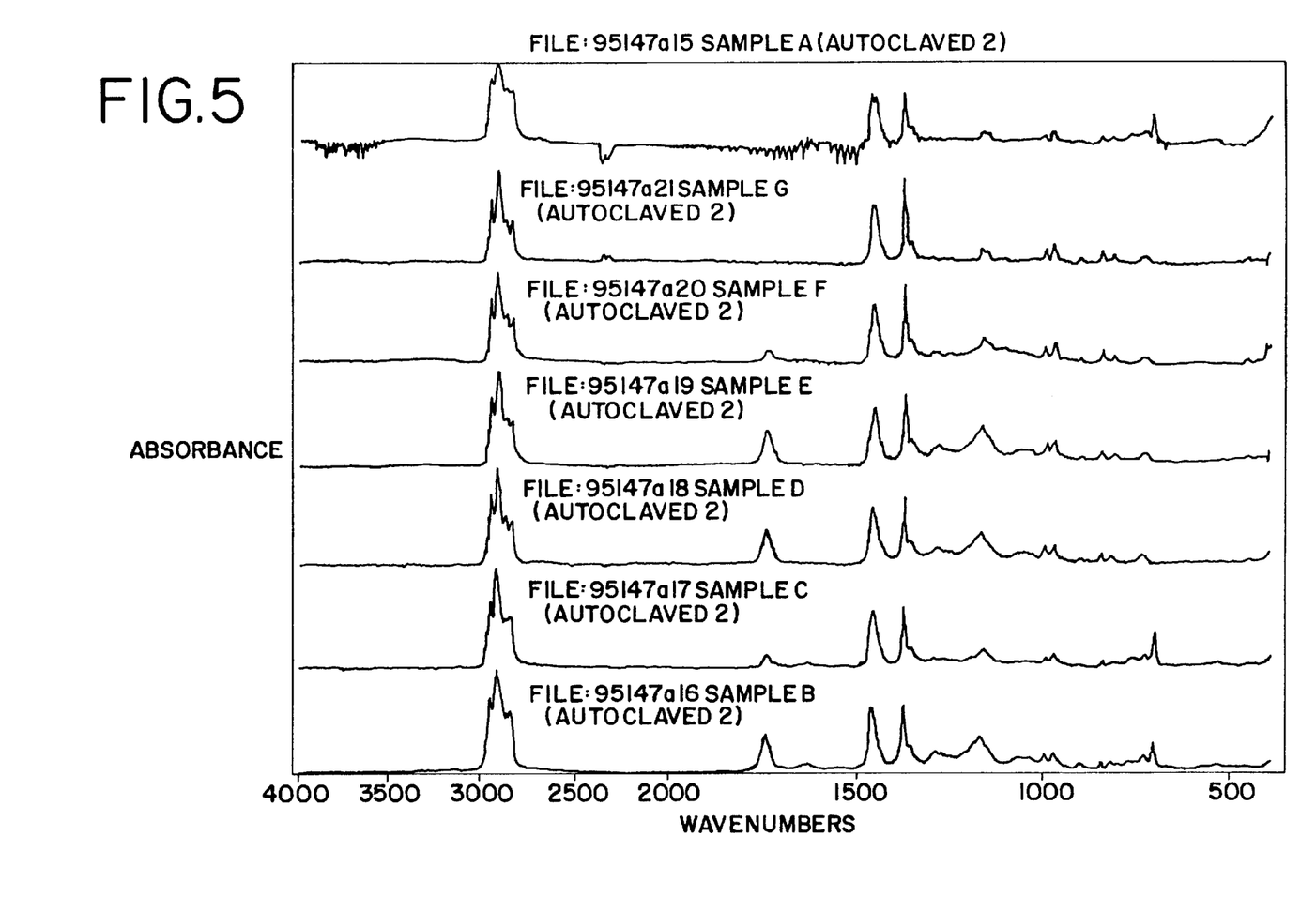
FIG. 5 is the FTIR absorbance spectra for certain medical containers embodying the present invention after 60 minutes of steam sterilization.

FIGS. 3–5 show the ability of the plastic composition to retain plasticizer during steam sterilization. The formulations set forth in Table 1 (using different amounts of the above described compounds) were prepared and made into containers generally in accordance with the method described above. The amount of plasticizer was measured (by FTIR spectroscopy) in each formulation before, after 20 minutes, and after 60 minutes of steam sterilization at approximately 120° C. The results of the measurements are set forth in FIGS. 3–5.

As seen in FIGS. 3–5 (and particularly, FIGS. 4 and 5), plastic compositions of the present invention are able to retain most of the original plasticizer (BTHC) even after exposure to a sterilizing temperature (e.g. 120° C.) for 60 minutes. For example, the area of the BTHC peak (at about 1730 $cm^{-1}$) in each sample is not substantially changed at 20 and/or at 60 minutes (FIGS. 4 and 5 respectively) of sterilization as compared to before sterilization (FIG. 3).

The above description is intended for illustrative purposes only and is not intended to limit the present invention to any one of the embodiments described above. The true scope of the present invention is defined by the claims set forth below.

That which is claimed:

1. A plastic composition comprising:
    a polyolefin copolymer; and
    a plasticizer;
    wherein said composition retains a sufficient amount of said plasticizer such that said composition has a flexibility that is substantially unchanged upon heating to a sterilizing temperature relative to said flexibility before said heating.

2. The plastic composition of claim 1 wherein said polyolefin copolymer comprises a polypropylene copolymer.

TABLE 1

PLASTIC COMPOSITION FORMULATIONS

| Supplier | Polymer | Grade A–G | A | B | C | D | E | F | G |
|---|---|---|---|---|---|---|---|---|---|
| | | | % | % | % | % | % | % | % |
| Montell | Catalloy PP | KS-051P | 60 | 60 | 80 | 50 | 70 | 75 | 60 |
| Montell | Copolymer PP | SA-849S | 5 | 5 | 10 | 30 | 24.5 | 25 | 5 |
| Henkel | Polyamide | TPX-159 | 7 | 7 | | | | | 10 |
| Shell | Kraton | G-1924X | 7 | 7 | | | | | 10 |
| Shell | Kraton | K-1660 | 11 | 16 | | | | | 15 |
| Morflex | Plasticizer | BTHC | 10 | 5 | 10 | 20 | 5 | | |
| La Roche | Stabilizer | Vitamin E | | | | | 0.5 | | |

Medical containers made in accordance with the present invention may be prepared by mixing the above described components in approximately the above described amounts in a large scale mixer. The polyolefin copolymers and plasticizer are mixed for anywhere between 1 to 30 minutes and, most typically, approximately 5 minutes. Other components described above may be added to the composition and the entire blend may be extruded, in ways that are 3. The plastic composition of claim 1 further comprising a second polyolefin copolymer.

4. The plastic composition of claim 3 wherein said second polyolefin copolymer comprises a polypropylene copolymer.

5. The plastic composition of claim 1 comprising by weight of said composition:

between approximately 30%–99% of a polypropylene copolymer;

between approximately 1%–50% of said plasticizer.

6. A plastic composition comprising by weight of said composition:

between approximately 50%–95% of a first polypropylene copolymer;

between approximately 4%–49% of a second polypropylene copolymer; and between approximately 1%–30% of a plasticizer.

7. The plastic composition of claim 1 further comprising a block copolymer.

8. The plastic composition of claim 1 further comprising a polyamide.

9. The plastic composition of claim 1 further comprising a stabilizer.

10. The plastic composition of claim 1 comprising, by weight of said composition:

between approximately 30–80% of a first polypropylene copolymer;

between approximately 5%–30% of a second polypropylene copolymer;

between approximately 0%–15% of a polyamide;

between approximately 0%–20% of a first block copolymer;

between approximately 0%–50% of a second block copolymer; and between approximately 1%–40% of a plasticizer; and between approximately 0%–5% of a stabilizer.

11. The plastic composition of claim 1 wherein said plasticizer comprises a citrate ester.

12. The plastic composition of claim 11 wherein said citrate ester is n-butyryltri-n-hexyl citrate.

13. The plastic composition of claim 1 wherein said composition is capable of retaining at least 50% of said plasticizer.

14. The plastic composition of claim 1 wherein said polyolefin copolymer is capable of retaining and effective amount of plasticizer after heating at approximately 120° C. for at least 20 minutes.

15. The plastic composition of claim 1 wherein said polyolefin copolymer is capable of retaining and effective amount of plasticizer after heating at approximately 120° C. for at least 60 minutes.

16. The plastic composition of claim 10 wherein said first block copolymer is non-functionalized and comprises a central block of ethylene and butylene and terminal blocks of styrene and said second block copolymer is functionalized and comprises a central block of ethylene and butylene and terminal blocks of styrene.

17. The plastic composition of claim 9 wherein said stabilizer comprises Vitamin E.

18. The composition of claim 1 wherein said polyolefin comprises a porous polypropylene copolymer and said plasticizer comprises a citrate ester.

19. The composition of claim 17 wherein said polyolefin copolymer is a copolymer of propylene and at least one monomer selected from the group of ethylene and butylene.

20. A plastic container having a wall, wherein at least a portion of the wall is made of a plastic composition, said plastic composition comprising:

a polyolefin copolymer; and a plasticizer;

wherein said composition retains a sufficient amount of said plasticizer such that said container has a flexibility that is substantially unchanged upon heating to a sterilizing temperature relative to said flexibility before such heating.

21. The container of claim 20 wherein said plasticizer is capable of contacting blood cells stored therein to suppress hemolysis.

22. The container of claim 20 wherein said wall is defined by a plurality of plastic layers and at least a portion of said layer in contact with said blood cells comprises said plastic composition.

23. The container of claim 20 wherein said polyolefin copolymer comprises a polypropylene copolymer.

24. The container of claim 20 wherein said composition further comprises a second polyolefin copolymer.

25. The container of claim 24 wherein said second polyolefin copolymer comprises a polypropylene copolymer.

26. The container of claim 20 wherein said composition comprises, by weight:

between approximately 50%–99% of a polypropylene copolymer;

between approximately 1%–50% of said plasticizer.

27. A plastic container having a wall, wherein at least a portion of the wall is made of a plastic composition wherein said composition comprises by weight:

between approximately 50%–95% of a first polypropylene copolymer;

between approximately 4%–49% of a second polypropylene copolymer; and between approximately 1%–30% of a plasticizer.

28. The container of claim 20 wherein said composition further comprises a first non-functionalized block copolymer and a second functionalized block copolymer.

29. A plastic container having a wall, wherein at least a portion of the wall interior surface is made a plastic composition comprising a polyolefin copolymer, plasticizer and a polyamide.

30. The container claim 20 wherein said composition further comprises a stabilizer.

31. The container of claim 20 wherein said composition comprises, by weight:

between approximately 30–80% of a first polypropylene copolymer;

between approximately 5%–30% of a second polypropylene copolymer;

between approximately 0%–20% of a polyamide;

between approximately 0%–20% of a first block copolymer;

between approximately 0%–50% of a second block copolymer; and between approximately 1%–40% of a plasticizer; and between approximately 0%–5% of a stabilizer.

32. The container of claim 20 wherein said plasticizer comprises a citrate ester.

33. The container of claim 32 wherein said citrate ester is n-butyryl hexyl citrate.

34. The container of claim 20 wherein said polyolefin is capable of retaining at least 50% of said plasticizer.

35. The container of claim 20 wherein said polyolefin copolymer is capable of retaining and effective amount of plasticizer after heating at approximately 120° C. for at least 20 minutes.

36. The container of claim 20 wherein said polyolefin copolymer is capable of retaining and effective amount of plasticizer after heating at approximately 120° C. for at least 60 minutes.

37. The container of claim 28 wherein said first block copolymer comprises a central block of ethylene and butylene and terminal blocks of styrene.

38. The container of claim 30 wherein said stabilizer comprises Vitamin E.

39. The container of claim 20 wherein said polyolefin copolymer comprises a porous polypropylene copolymer and said plasticizer comprises a citrate ester.

40. The container of claim 20 wherein said polyolefin copolymer comprises propylene and ethylene units.

41. The container of claim 20 wherein the thickness of said container wall is between approximately 5–18 mils.

* * * * *

UNITED STATES PATENT AND TRADEMARK OFFICE
CERTIFICATE OF CORRECTION

PATENT NO. : 5,952,423
DATED : September 14, 1999
INVENTOR(S) : Shaye-Wen Shang, Michael Tung-Kiung Ling, Lecon Woo It is certified that error appears in the above-identified patent and that said Letters Patent is hereby corrected as shown below:

Column 1, line 13, delete "suppresses" and insert —supress—;

Column 6, line 19, after "1994", insert —now U.S. Patent No. 5,683,768—;

Column 7, line 7, after "application", insert —serial no. 08/897,049—;

In the claims:
Column 10, line 37, after "made", insert —of—

Signed and Sealed this

Fifth Day of June, 2001

NICHOLAS P. GODICI

*Acting Director of the United States Patent and Trademark Office*